United States Patent [19]

Walsh

[11] Patent Number: 4,631,240
[45] Date of Patent: Dec. 23, 1986

[54] ELECTROCHEMICAL CELL

[75] Inventor: Fraser M. Walsh, Arlington, Mass.

[73] Assignee: Tracer Technologies, Inc., Newton, Mass.

[21] Appl. No.: 969,227

[22] Filed: Dec. 13, 1978

[51] Int. Cl.[4] ............................................. H01M 4/36
[52] U.S. Cl. ................................ 429/105; 429/198; 429/199; 429/212
[58] Field of Search ............... 429/101, 105, 198, 199, 429/229, 213, 212

[56] References Cited

U.S. PATENT DOCUMENTS

| 4,038,459 | 7/1977 | Ajami et al. | 429/101 X |
| 4,038,460 | 7/1977 | Walsh et al. | 429/101 X |
| 4,064,324 | 12/1977 | Eustace | 429/101 |
| 4,104,447 | 8/1978 | Walsh et al. | 429/101 X |
| 4,105,829 | 8/1978 | Venero | 429/101 X |
| 4,147,840 | 4/1979 | Walsh | 429/198 X |

FOREIGN PATENT DOCUMENTS 853375 10/1977 Belgium .

Primary Examiner—Charles F. LeFevour
Attorney, Agent, or Firm—Kenway & Jenney

[57] ABSTRACT

An improved metal-halogen electrochemical cell, particularly a zinc bromide cell, contains a water soluble tetraorgano-substituted amino acid, ester or betaine salt in the electrolyte which forms a substantially water insoluble liquid complex with cathodic halogen thereby reducing self-discharge of the cell.

3 Claims, 1 Drawing Figure

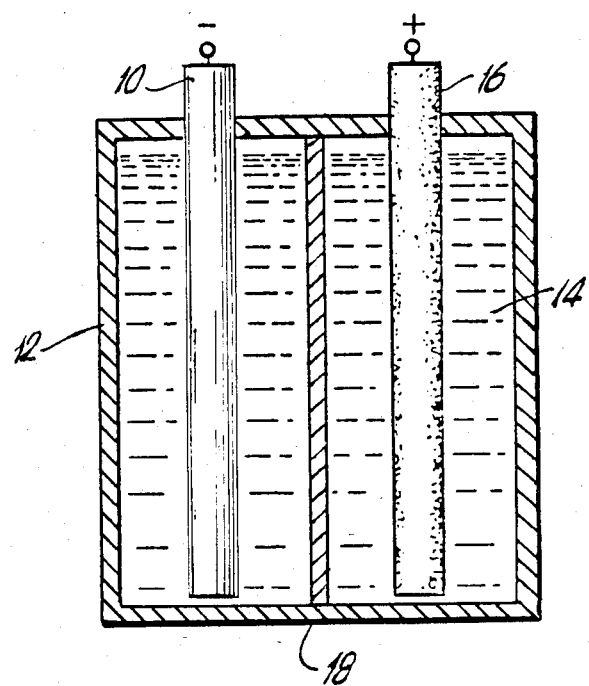

ELECTROCHEMICAL CELL

BACKGROUND OF THE INVENTION

This invention relates to cells containing compounds useful for complexing halogens and more particularly cells and batteries of the type which utilize a halogen as its electrochemically active agent.

Voltaic cells which include an aqueous solution of zinc of cadmium halide as an electrolyte are known, but are frequently characterized by a relatively high self-discharge rate, low capacity, and high internal resistance. Since elemental halogen is soluble in the aqueous electrolyte, it is difficult to keep metallic zinc or cadmium and elemental halogen apart while simultaneously achieving a system in which a good percentage of the theoretical energy storage capacity can be realized.

The instant invention constitutes an improvement in the halogen cell art and provides a large number of compounds, any one of which may be added to the electrolyte of halogen cells of the type described. The compounds of the invention eliminate the necessity of a depolarizer or a specifically fabricated electrode, yet provide increased halogen complexing ability, enhancing the shelf-life and capacity of the cells and batteries in which they are used.

SUMMARY OF THE INVENTION

It has been discovered that elemental bromine is sufficiently separated from an aqueous solution in a form of a liquid complex by chemical reaction of the molecular bromine with certain quaternary ammonium salts, especially quaternary ammonium chloride and bromide salts of N-organo substituted alpha amino acids, esters, and betaines. Indeed, the ammonium salts of the present invention can be considered generally to be derivatives of glycine. Specifically, the nitrogen substituted amino acids, ester or betaine derivatives contemplated by the present invention are selected from the group of compounds represented by the following formulas:

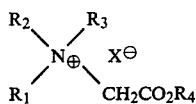

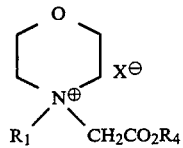

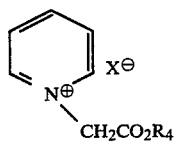

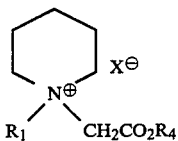

wherein $X^\ominus$ is a halide anion selected from the group consisting of chloride and bromide anions, $R_1$, $R_2$, and $R_3$ are aryl, alkyl and haloalkyl groups of from 1 to 8 carbon atoms, and $R_4$ is hydrogen in the case of acids or alkyl and haloalkyl groups of from 1 to 8 carbon atoms in the case of esters. In the case of betaines, $X^\ominus$ represents a negative charge on the carboxyl group and $R_4$ is nothing.

Thus, in one embodiment of the present invention there is provided an electrochemical cell comprising a metal anode selected from zinc and cadmium, a bromine cathode, an aqueous metal bromide solution as electrolyte, the metal of the metal bromide being the same as the metal of the anode and the aqueous metal bromide solution containing a water soluble acid salt of a N-organo substituted amino acid, ester, or betaine which substituted amino acid, ester, or betaine combines with bromine to form a substantially water immiscible liquid complex.

BRIEF DESCRIPTION OF THE DRAWING

The sole FIGURE of the drawing is a cross-sectional view of a cell in accordance with the present invention.

DETAILED DESCRIPTION OF THE INVENTION

Turning now to the sole FIGURE of the drawing, there is shown one embodiment of the cell of the present invention. As illustrated in the drawing, an electrochemical cell of the present invention comprises a metal anode 10 disposed in a container 12 containing aqueous electrolyte 14.

The metal anode in accordance with the present invention preferably is selected from zinc and cadmium. It should be noted, however, that it is not absolutely essential that the metal anode be formed solely of zinc or cadmium. Indeed, inert wire mesh or various forms of porous carbon materials upon which zinc or cadmium may be plated can serve very well in forming a zinc or cadmium electrode.

Thus, as is conventional practice, the terms "zinc electrode" and "bromine electrode" are not intended to imply that the electrodes are formed from these materials exclusively; but, are used merely to indicate the electrochemically active element reacting. Because cadmium is electrochemically similar to zinc, it is also obvious that the zinc of the electrode and the electrolyte can be replaced by cadmium. Furthermore, those skilled in the art will appreciate that the complex may be used to drive cells other than disclosed zinc and cadmium cells. For example, the complexes will be useful in other halogen utilizing cells which may employ titanium, chromium, or hydrogen as an anode.

Although bromine is used throughout this specification and claims, it will be apparent to those skilled in the art that chlorine, iodine, or any combination of bromine, chlorine, and iodine may be substituted for bromine. Although reference is made to the addition of one additive, a mixture of additives may be used in any one cell.

Furthermore, although reference is made to one counter electrode and one metal electrode, it is obvious that the compounds of the invention are useful in cells which include more than one pair of electrodes and with batteries of two or more cells constructed in accordance with methods known to those skilled in the art.

Spaced apart from the anode 10 is a chemically inert electrode 16. Inert electrode 16 is disposed within container 12 so as to be in contact with aqueous electrolyte 14 and the bromine active cathodic material which material will be described hereinafter in greater detail. Turning first, however, to electrode 16 it should be noted that a wide range of inert materials can be used for fabricating electrode 16, such as various forms of electrically conductive and non-corrosive materials, including porous carbon, graphite, vitreous carbon, and carbon felt. Indeed, the inert electrode 16 preferably is formed of a highly porous material which will absorb the bromine active material. A suitable chemically inert electrically conductive material for forming an inert electrode 16 for the practice of the present invention is carbon felt, such as UCAR grade VDF carbon felt sold by Union Carbide Corporation, Carbon Products Division, 270 Park Avenue, New York, NY.

The electrolyte of the cell of the present invention is an aqueous metal bromide solution in which the metal of the bromide corresponds to the metal of the anode. Thus, when zinc is the anode active material, the metal bromide used in the electrolyte is a zinc bromide. Similarly, with cadmium as the active metal anode material, the electrolyte is an aqueous cadmium bromide solution.

The concentration of metal bromide in the aqueous electrolyte is not critical and a wide range of concentrations may be employed depending, for example, on the desired energy density of the cell. Typically, the molarity of the aqueous metal bromide solution will be in the range of about 2.5 to 3.5 molar although the concentration can be as low as 0.5 molar and as high as 6.0 molar and higher.

Optionally, and preferably, other salts such as zinc sulfate may be added to the electrolyte to improve electrolyte conductivity and/or zinc plating characteristics. The effects of such additives are well known and form no part of the present invention.

As is shown in the sole FIGURE of the drawing, the cell is provided with a separator 18 which prevents internal shorting that can typically occur as a result of dendrite growth. The separator 18 can be any porous material or ion exchange membrane typically used to prevent physical contact of the two electrodes such as fiberglass mats, fibetglass felt, microporous polymeric materials such as porous polyethylene, and the like. A suitable separator may be purchased from W. R. Grace, Inc. under the tradename DARAMIC.

As is indicated above, the cathode active material of the present invention is molecular bromine. The cathodically, active material is present as a substantially water immiscible liquid halogen complex of certain quaternary ammonium salts of alpha amino acids, esters, or betaines. The types of N-organo substituted amino acids, esters, or betaines suitable in the practice of the present invention are those which have the following characteristics. First, the N-organo-substituted amino acids, ester, or betaine must be water soluble; and, second, it must be one which is capable of combining with bromine. Third, the resultant bromine complex which contains at least one molar equivalent of bromine must be a substantially water immiscible liquid in the cell which employs the complex at temperatures in the range of from about 10° to about 60° C. The ammonium salts presently contemplated by the present invention can be represented by the following structural formulas:

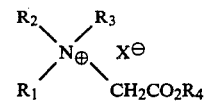

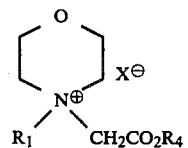

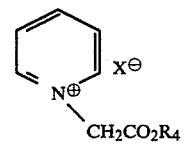

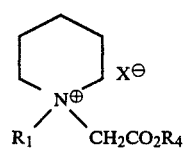

wherein X— is an anion selected from the group consisting of chloride and bromide, and wherein $R_1$, $R_2$, and $R_3$ are aryl, alkyl and haloalkyl groups having from 1 to 8 carbon atoms, and wherein $R_4$ is hydrogen in the case of acids or alkyl and haloalkyl groups having from 1 to 8 carbon atoms in the case of esters. In the case of betaines $X^\theta$ represents a negative charge on the carboxyl group and $R_4$ is nothing. Representative examples of the foregoing type of compounds are listed in Table I.

TABLE I

| Structural Formula | Chemical Formula |
|---|---|
| CH₃\N⁺/CH₃ Br⁻ / \ CH   CH₂CO₂H | $C_3H_{12}N_2Br$ |
| (pyridinium) Br⁻ CH₂CO₂H | $C_7H_8O_2NBr$ |
| (morpholinium) Br⁻ CH₃ CH₂CO₂H | $C_7H_{14}O_3NBr$ |
| (piperidinium) Br⁻ CH₃ CH₂CO₂H | $C_8H_{16}O_2NBr$ |
| (phenyl) —N⁺—CH₂COOH CH₃ Br⁻ | $C_{10}H_{14}O_2NBr$ |

TABLE I-continued

| Structural Formula | Chemical Formula |
|---|---|
| CH$_3$<br>    \|<br>CH$_3$—N$^+$—CH$_2$COOCH$_3$<br>    \|<br>   CH$_3$  Br$^-$ | C$_6$H$_{14}$O$_2$NBr |

The preferred organo-substituted amino acid salts of the present invention are the piperidinium salts described herein.

The substituted amino acid, ester, or betaine salts used in the cell of the present invention is dissolved in the electrolyte solution 14 where it is available to complex the cathodic halogen upon charging of the cell. The amount of amino acid, ester, or betaine salt used will depend upon the amount of halide present in the electrolyte and the depth of charge of the cell. Generally, however, the ratio of amino acid, ester, or betaine salt to metal halide used will be from about 1:4 to about 1:1. Typically, the ratio of the amino acid, ester, or betaine salt to metal halide will be 1:3.

The halogen complexing amino acid, ester, or betaine salts can be prepared by standard techniques. Indeed, the method of preparation of such materials forms no part of the present invention. Generally, esters can be prepared by reacting an appropriate tertiary amine with a haloalkyl carboxylic ester such as ethyl bromoacetate. Thus, for example, trimethylamine can be reacted with ethyl bromoacetate to produce trimethyl-(1-ethoxycarbonyl)-methyl ammonium bromide. Similarly, tertiary amines such as pyridine can be reacted with ethyl bromoacetate to yield the corresponding salt, 1-ethoxyl carbonyl methyl pyridinium bromide. The acids are prepared by hydrolysis of the corresponding esters or by reaction of the appropriate trialkyl amine with an appropriate haloalkyl carboxylic ester.

As will be appreciated, when the cell is charged, halogen is produced at the surface of the inert cathode 16 where it will complex with the halogen complexing amino acid, ester, or betaine present in the electrolyte to form a liquid insoluble halogen complex. Thus, with a zinc bromide electrolyte, bromine is generated at electrode 16 during charging of the cell. The bromine so generated is complexed by the amino acid, ester, or betaine.

In the cell shown in the drawing, the inert electrode 16 is a porous material which is capable of storing the liquid halogen complex within the pores of the electrode structure.

It will be appreciated that one of the advantages in the use of N-organic substituted amino acid, ester, or betaine chlorides and bromides in accordance with the present invention is that the halogen complex which results from the combination of the bromine and the complexing amino acid, ester, or betaine derivative is a liquid at normal cell operating temperature and it is fluid. It does not require additional volumes of materials such as aprotic solvents or organic materials to keep the complex in a liquid form, thereby increasing the volume of the liquid that must be handled in order to complex the bromine.

The following examples illustrate the modes of practice in the present invention.

EXAMPLE 1

A cell consisting of a glass case enclosing a bromine electrode, a zinc electrode, a separator and a zinc bromide electrolyte with compounds of the invention was constructed. The bromine electrode consisted of a piece of VDF carbon felt (Union Carbide) pressed against a graphite plate current collector; the zinc electrode was a similar graphite plate. The separator was a piece of ribbed Daramic (W.R. Grace). The electrode surface area was 40 cm$^2$. The electrolyte consisted of 50 ml of water to which was added 9.0 g of zinc bromide, 2.1 g of N,N,N-trimethyl-N-carbomethoxymethyl ammonium bromide and 1.5 g of zinc sulfate. The cell was cycled at 22° C. under a two hour charge at one amp followed by discharge at one amp regime. The output of the cell on the first cycle was 0.8 amp-hours. A control cell, identical except for there was no ammonium ester salt in the electrolyte, when cycled under identical conditions gave an output of less than 0.1 amp-hours.

EXAMPLE 2

Three N-organo substituted alpha amino acids (one betaine and two betaine hydrobromides) were evaluated to demonstrate that they form liquid organic polyhalides at room temperature 20° C.-25° C. in 1.0 M zinc bromide in the presence of bromine These compounds are shown in Table II. The evaluation required adding 0.25 ml of bromine to 2 ml of an aqueous solution consisting of 0.1 M of the N-organo alpha amino acid and 1.0 M zinc bromide in a test tube. The solution was mixed by vigorous shaking and then examined for the formation of a separate phase liquid organic polyhalide. The three compounds shown in Table II formed separate phases. In the absence of the addition of the ammonium acid salt, no separate phase was observed to be formed. The formation of a separate phase by these three compounds shows that they are exemplar compounds which can be used as was the ester in Example 1.

TABLE II

| N—Organo Alpha Amino Acids | |
|---|---|
| Structural Formula | Chemical Formula |
| Ph—N$^+$(CH$_3$)$_2$—CH$_2$COOH  Br$^-$ | C$_{10}$H$_{14}$O$_2$NBr |
| Ph—N$^+$—CH$_2$COOH  Br$^-$ | C$_7$H$_8$O$_2$NBr |
| Ph—N$^+$(CH$_3$)$_2$—CH$_2$COO$^-$ | C$_{10}$H$_{13}$O$_2$N |

Thus, the broad concept of this invention is an electrochemical cell having a metal anode; a bromine cathode; an aqueous electrolyte and a bromine complexing agent in said electrolyte, said complexing agent being a quaternary ammonium salt of an N-organo substituted alpha amino acid, ester, or betaine having one of the following formulas:

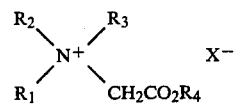

-continued

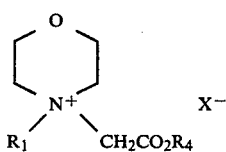

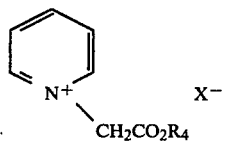

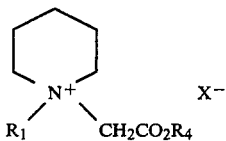

wherein $X^\ominus$ is a halide anion selected from the group consisting of chloride and bromide ions, $R_1$, $R_2$, and $R_3$ are aryl, alkyl and haloalkyl groups of from 1 to 8 carbon atoms and $R_4$ is hydrogen in the case of acids or alkyl and haloalkyl groups of from 1 to 8 carbon atoms in the case of esters and in the case of betaines $X—$ represents a negative charge on the carboxyl group and $R_4$ is nothing. The quaternary ammonium salt is soluble in water and forms a cathodically active halogen complex which is a substantially water immiscible liquid at temperatures in the range of from about 10° to about 60° C.

Another aspect of the invention is an electrochemical cell having a metal anode wherein the metal is selected from zinc and cadmium; a bromine cathode; an aqueous electrolyte containing a metal bromide, the metal bromide having the same metal as the metal of the anode and a bromine complexing agent in said aqueous metal bromide electrolyte, said complexing agent consisting solely of a quaternary ammonium salt of an N-organo substituted alpha amino acid having one of the following formulas:

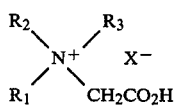

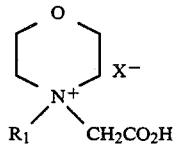

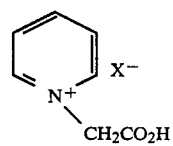

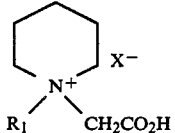

wherein $X—$ is a halide anion selected from the group consisting of chloride and bromide ions, $R_1$, $R_2$, and $R_3$ are alkyl and haloalkyl groups of from 1 to 8 carbon atoms. The quaternary ammonium salt is soluble in water and forms a cathodically active halogen complex which is substantially water immiscible liquid at temperatures in the range of from about 10° to about 60° C.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. In an electrochemical cell having a metal anode wherein the metal is selected from zinc and cadmium; a bromine cathode; an aqueous electrolyte containing a metal bromide, the metal bromide having the same metal as the metal of the anode, the improvement comprising: a bromine complexing agent in said aqueous metal bromide electrolyte, said complexing agent consisting solely of a quaternary ammonium salt of an N-organo substituted alpha amino acid, ester, or betaine having one of the following formulas:

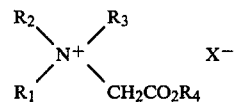

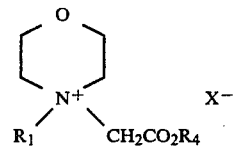

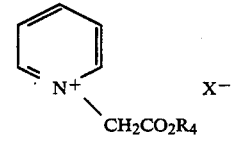

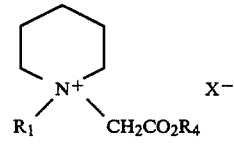

wherein $X^\ominus$ is a halide anion selected from the group consisting of chloride and bromide ions, $R_1$, $R_2$, and $R_3$ are aryl, alkyl and haloalkyl groups of from 1 to 8 carbon atoms and $R_4$ is hydrogen in the case of acids or alkyl and haloalkyl groups of from 1 to 8 carbon atoms in the case of esters and in the case of betaines $X—$ represents a negative charge on the carboxyl group and $R_4$ is nothing which quaternary ammonium salt is soluble in water and forms a cathodically active halogen complex which is substantially water immiscible liquid at temperatures in the range of from about 10° to about 60° C.

2. An aqueous metal halogen secondary battery including a plurality of electrochemical cells, said electrochemical cells comprising a zinc anode; an inert counterelectrode; an aqueous electrolyte, said aqueous electrolyte consisting essentially of an aqueous zinc bromide solution and a cathodically active bromine complex, which complex is a liquid at temperratures below 60° C. and which complex is substantially water immiscible, said bromine complex being formed solely between bromine and a water soluble quaternary ammonium salt of an N-organo substituted alpha amino acid, ester, or betaine said salt being selected from those having the following formulas:

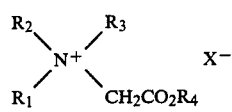

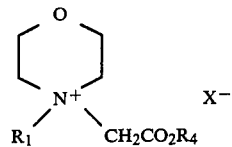

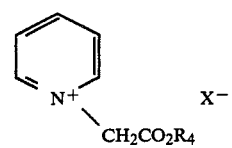

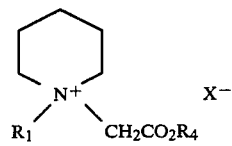

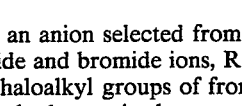

wherein X— is an anion selected from the group consisting of chloride and bromide ions, $R_1$, $R_2$ and $R_3$ are aryl, alkyl and haloalkyl groups of from 1 to 8 carbon atoms, and $R_4$ is hydrogen in the case of acids or alkyl and haloalkyl groups of from 1 to 8 carbon atoms in the case of esters and in the case of betaines X— represents a negative charge on the carboxyl group and $R_4$ is nothing.

3. An aqueous zinc-bromide cell comprising: a zinc anode; a cathodically active bromine complex; an inert electrode; and an aqueous zinc bromide electrolyte said cathodically active bromine complex being formed solely between bromine and a water soluble quaternary ammonium salt of an N-organo substituted amino acid, ester, or betaine selected from those having the general formulas:

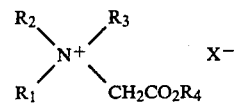

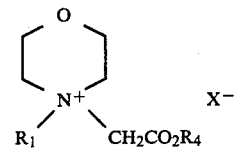

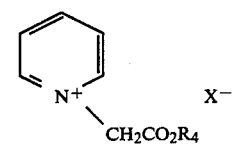

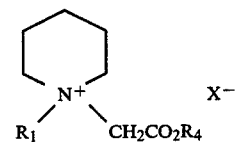

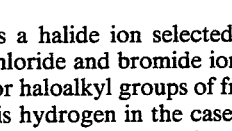

wherein X— is a halide ion selected from the group consisting of chloride and bromide ions, $R_1$, $R_2$ and $R_3$ are aryl, alkyl or haloalkyl groups of from 1 to 8 carbon atoms, and $R_4$ is hydrogen in the case of acids or alkyl and haloalkyl groups of from 1 to 8 carbon atoms in the case of esters and in the case of betaines X— represents a negative charge on the carboxyl group and $R_4$ is nothing and wherein said bromine complex of said N-organo substituted amino acid salt is a substantially water immiscible complex which is a liquid at temperatures ranging from about 10° to about 60° C.

* * * * *